(12) United States Patent
Padmanabha et al.

(10) Patent No.: US 9,870,226 B2
(45) Date of Patent: Jan. 16, 2018

(54) CONTROL OF SWITCHING BETWEEN EXECUTED MECHANISMS

(71) Applicant: THE REGENTS OF THE UNIVERSITY OF MICHIGAN, Ann Arbor, MI (US)

(72) Inventors: Shruti Padmanabha, Ann Arbor, MI (US); Andrew Lukefahr, Ann Arbor, MI (US); Reetuparna Das, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 610 days.

(21) Appl. No.: 14/323,040

(22) Filed: Jul. 3, 2014

(65) Prior Publication Data

US 2016/0004534 A1    Jan. 7, 2016

(51) Int. Cl.
*G06F 9/30* (2006.01)
*G06F 9/38* (2006.01)
*G06F 1/32* (2006.01)

(52) U.S. Cl.
CPC ......... *G06F 9/30189* (2013.01); *G06F 1/32* (2013.01); *G06F 9/384* (2013.01); *G06F 9/3836* (2013.01); *G06F 9/3891* (2013.01)

(58) Field of Classification Search
None
See application file for complete search history.

(56) References Cited

U.S. PATENT DOCUMENTS

| | | |
|---|---|---|
| 6,317,840 B1 | 11/2001 | Dean et al. |
| 9,442,758 B1 * | 9/2016 | Sakarda ............... B60K 7/0007 |
| 2003/0115242 A1 | 6/2003 | Hayduk |
| 2004/0003215 A1 | 1/2004 | Krimer |
| 2006/0095913 A1 | 5/2006 | Bodas |
| 2008/0263324 A1 | 10/2008 | Sutardja |
| 2009/0150890 A1 * | 6/2009 | Yourst ..................... G06F 8/445 |
| | | 718/102 |
| 2009/0164812 A1 | 6/2009 | Capps, Jr. |
| 2009/0293061 A1 | 11/2009 | Schwinn et al. |

(Continued)

OTHER PUBLICATIONS

Lukefahr, Andrew, et al. "Composite cores: Pushing heterogeneity into a core." *Proceedings of the 2012 45th Annual IEEE/ACM International Symposium on Microarchitecture.* IEEE Computer Society, 2012., 12 pgs.

(Continued)

*Primary Examiner* — John Lindlof
(74) *Attorney, Agent, or Firm* — Nixon & Vanderhye P.C.

(57) ABSTRACT

A data processing apparatus includes a first execution mechanism, such as an out-of-order processing circuitry, and a second execution mechanism 6 such as an in-order processing circuitry. Switching control circuitry controls switching between which of the first execution circuitry and the second execution circuitry is active at a given time. Latency indicating signals indicative of the latency associated with a candidate switching operation to be performed are supplied to the switching control circuitry and used to control the switching operation. The control of the switching operation may be to accelerate the switching operation, prevent the switching operation, perform early architectural state data transfer or other possibilities.

19 Claims, 3 Drawing Sheets

(56) References Cited

U.S. PATENT DOCUMENTS

| | | | |
|---|---|---|---|
| 2009/0327944 A1 | 12/2009 | Sugure | |
| 2011/0213993 A1 | 9/2011 | Greenhalgh | |
| 2011/0271126 A1 | 11/2011 | Hill | |
| 2012/0233477 A1 | 9/2012 | Wu | |
| 2013/0080805 A1 | 3/2013 | Vick | |
| 2014/0101411 A1 | 4/2014 | Sakarda | |
| 2014/0129808 A1* | 5/2014 | Naveh | G06F 9/4856 712/225 |
| 2014/0281402 A1 | 9/2014 | Comparan | |

OTHER PUBLICATIONS

Padmanabha, Shruti, et al. "Trace based phase prediction for tightly-coupled heterogeneous cores." *Proceedings of the 46th Annual IEEE/ACM International Symposium on Microarchitecture.* ACM, 2013, 12 pgs.

R. Kumar, D. M. Tullsen, and N. P. Jouppi, "Core architecture optimization for heterogeneous chip multiprocessors," in Proc. of the 15$^{th}$ International Conference on Parallel Architectures and Compilation Techniques, 2006, pp. 23-32.

Rotenberg, Eric, et al. "Rationale for a 3D Heterogeneous Multi-core Processor." *migration* 100.1K (2013): 10K, 15 pgs.

U.S. Appl. No. 14/093,042, filed Nov. 29, 2013, Padmanabha et al.

T. Sherwood et al, "Discovering and Exploiting Program Phases" IEEE Nov. 2003, pp. 84-93.

T. Sherwood et al, "Phase Tracking and Prediction" Proceedings of the 30$^{th}$ International Symposium on Computer Architecture (ISCA), Jun. 2003, pp. 1-12.

J.E. Smith et al, "Dynamic Microarchitecture Adaptation via Co-Designed Virtual Machines" 2002 IEEE International Solid-State Circuits Conference, 2002, 2 pages.v.

E. Rotenberg et al, "Trace Processors" Proceedings of Micro-30, Dec. 1997, 12 pages.

K.K. Rangan et al, "Thread Motion: Fine-Grained Power Management for Multi-Core Systems" ISCA '09, Jun. 2009, 12 pages.

P. Greenhalgh, Big.LITTLE Processing with ARM Cortex™-A15 & Cortex-A7, Sep. 2011, 8 pages.

International Search Report and the Written Opinion of the International Searching Authority dated Jan. 28, 2015 in PCT/US2014/060393, 8 pages.

UK Combined Search and Examination Report issued Oct. 8, 2015 in GB 1508774.5, 5 pages.

Final Office Action dated May 9, 2016 in co-pending U.S. Appl. No. 14/093,042, 20 pages.

Office Action dated Jan. 14, 2016 in co-pending U.S. Appl. No. 14/093,042, 26 pages.

C. Augonnet et al, "Automatic Calibration of Performance Models on Heterogeneous Multicore Architectures" Euro-Par 2009 Parallel Processing Workshops, HPPC, HeteroPar, PROPER, ROIA, UNICORE, VHPC Revised Selected Papers: 10 pages, Springer Verlag. Aug. 2009.

J. Cong et al, "Energy-Efficient Scheduling on Heterogeneous Multi-Core Architectures" ISLPED 2012, Jul. 30-Aug. 1, 2012, pp. 345-350.

International Preliminary Report on Patentability dated Jun. 9, 2016 in PCT/US2014/060393, 6 pages.

Examiner's Answer dated Feb. 27, 2017 in co-pending U.S. Appl. No. 14/093,042, 10 pages.

\* cited by examiner

CONTROL OF SWITCHING BETWEEN EXECUTED MECHANISMS

BACKGROUND OF THE INVENTION

This invention relates to the field of data processing systems. More particularly, this invention relates to the field of data processing systems having a plurality of execution mechanism for executing program instructions and between which a selection may be made as to which execution mechanism is active to execute the stream of program instructions at a given time.

It is known to provide data processing systems, such as those employing the techniques of the big.LITTLE processors designed by ARM Limited of Cambridge, England which incorporate multiple execution mechanisms among which an active execution mechanism is selected. These processors typically include a low performance and low power processor core together with a high performance and high power processor core. When the processing workload is such that a high performance is not required, then the processing is switched so as to be performed by the more energy efficient low power processor core. Conversely, when the processing workload is such that high performance is necessary, then the workload is switched to the high performance processor core. The granularity with which the switching is performed in such systems is large as it can take many hundreds and thousands of processing cycles to move the processor state between the small lower powered processor core and the large high performance processor core.

While the above systems may be used with advantage, it has been noted that in many real life processing loads the changes between a requirement for high performance versus low power occur at a finer level of granularity than may be dealt with in a system in which when one of the cores shut down, the entire processor state is transferred to the other processor core and then that other processor core started. This restricts the benefit which can be achieved.

SUMMARY

Viewed from one aspect the present technique provides apparatus for processing data comprising:
first execution circuitry configured to execute program instructions;
second execution circuitry configured to execute program instructions;
switching control circuitry coupled to said first execution circuitry and to said second execution circuitry and configured to control a switching operation between a first state in which program instructions are executed by said first execution circuitry and a second state in which program instructions are executed by said second execution circuitry, said switching operation including transferring at least some architectural state data from said first execution circuitry to said second execution circuitry, wherein
said switching control circuitry is configured:
to receive first latency indicating signals dependent upon a current state of said first execution circuitry from said first execution circuitry; and
to control switching from said first state to said second state in dependence upon said first latency indicating signals, said first latency indicating signals indicating a first latency associated with switching from said first state to said second state.

The present techniques recognise that when performing switching between first execution circuitry and second execution circuitry to execute the program instructions, it is desirable to take account of the latency involved in switching between the execution mechanisms. As an example, it may not be desirable to initiate a switch between the execution mechanisms if the latency involved is so long that, by the time the switch has been accomplished the processing requirements are likely to have changed such that the reason to make the switch is no longer current.

In some embodiments the performance characteristics of the first and second execution circuitry may differ.

It will be appreciated that as well as taking account of latency when switching from the first execution circuitry to the second execution circuitry, it may in some embodiments also be desirable to take account of latency when switching in the opposite direction. Furthermore, the present techniques are not limited to embodiments employing only two forms of execution circuitry and in practice may be useful in embodiments including three or more different forms of execution circuitry.

These different forms of execution circuitry may have heterogeneous microarchitectures leading to different performance characteristics, such as speed of execution of certain processing workloads, power consumption, leakage, thermal performance or many other different types of performance characteristic.

It will be appreciated that the architectural state data which is transferred between the first execution circuitry and the second execution circuitry upon a switch could take a variety of different forms. Depending upon the particular implementation, the different processing circuitry may naturally share some state data, such as memory management unit data, translation lookaside buffer data, cache memory data etc., whereas other state data may be held specifically within a particular instance of the processing circuitry and require transfer, such as the contents of the register file circuitry.

The register file circuitry contains registers storing data values being manipulated by an instance of execution circuitry at any given time and when the processing operation is migrated from the first execution circuitry to the second execution circuitry, then it may be necessary to transfer the current contents of the register file circuitry so that the processing may continue on the newly active processing circuitry continuing with the same architectural register contents as they previously were held on the processing circuitry which was formerly active.

In some embodiments, the first latency indicating signals may be indicative of pending write operations to respective register within the first register file circuitry. In this arrangement the switching operation may be arranged to transfer register state data from registers within the first register file circuitry for which there are no pending write operations to the second register file circuitry before the first execution circuitry has finished execution of program instructions. Thus, an early start may be made upon transferring the register state data such that this will be available on the newly activated processing circuitry before the previously active processing circuitry has completely drained. This arrangement may enable the newly active processing circuitry to commence execution of program instructions earlier and so reduce the latency associated with the switching operation.

Some example embodiments may track such pending write operations in different ways, such as using data from register allocation table circuitry and/or reorder buffer circuitry or other control data structures within the execution circuitry.

When a write operation which was initially pending when a switch operation was started has been completed, then the switching may at that time transfer the register state from those registers as it is now available.

It will be appreciated that in some embodiments the first execution circuitry may include register allocation table circuitry which stores register allocation data indicative of which physical registers within the register file circuitry are mapped to which of a plurality of architectural register identifiers. Such a register allocation table is often provided within out-of-order processors in which there is no fixed mapping between the physical registers which stores a data value and an architectural register identifier to which that data value belongs. In such embodiments that have a register allocation table, the hardware driven operation which performs the register state data transfer may read the register allocation data and use this to determine which physical registers contain register state data which is both needed to be transferred and is ready to be transferred to the new processing circuitry. In practice, the use of the register allocation circuitry by the hardware driver operation may be readily achieved as the register allocation table circuitry will cease to be accessed as a consequence of new program instructions being issued to the first execution circuitry prior to the switching operation and accordingly the read ports of the register allocation table circuitry will be available to supply data to the hardware driven operation which undertakes the register data transfer.

The latency overhead associated with the switching operation may be reduced in some embodiments in which the switching control circuitry serves to commence speculatively executing program instructions based upon a partial transfer of at least some of the register state data before the first execution circuitry is finished executing program instructions. Such speculative execution of program instructions may not include the committing of those program instructions until their predecessor instructions have committed, but nevertheless, their processing may be commenced and accordingly their results may available earlier and the latency associated with the switching operation thereby reduced.

As will be appreciated, the at least some architectural state data which may be necessary in order to commence speculative execution could take a variety of different forms depending upon which architectural data is or is not already shared by the different execution mechanisms. In some embodiments this at least some architectural state data which needs to be transferred before speculative execution may be commenced may comprise state data from registers for which there are no pending write operations and which form input operands to the program instructions which are to be speculative executed.

The switching control circuitry may, in some embodiments, operate to identify a potential switch point within a sequence of program instructions for switching from the first state in which the first execution circuitry is active to the second state in which the second execution circuitry is active.

The switching control circuitry may serve to control switching in the sense of suppressing the switching from the first state to the second state if the first latency indicating signal indicates a latency of greater than a threshold latency in order to perform the switch.

The latency indicating signal may indicate latency in a variety of different ways. The latency might be directly or indirectly indicated. In some embodiments the latency indicating signal may indicate latency in the form of an occupancy signal of reorder buffer circuitry within the first execution circuitry. Such reorder buffer circuitry serves to store data for uncommitted program instructions and when a switch is made, such state data for uncommitted program instructions may need to be drained and applied before the switch can be safely made. Accordingly, if the occupancy of the reorder buffer circuitry is too high, then this will indicate that the latency associated with the switch will also be too high and accordingly a switch may not be desirable.

When a switch is to be performed at a switching point, then in some embodiments, and in some situations, this may be achieved by draining an execution pipeline within the first execution circuitry of any instructions issued ahead of the switching point and ceasing issuing instructions following the switching point, with instructions following the switching point instead being issued to the second execution circuitry. The time taken to perform this drain of the pipeline is a factor influencing the latency associated with the switch.

In some other embodiments, either in combination with or as an alternative to the above, the first latency indicating signal may comprise time-to-complete signal indicating whether or not any instructions preceding the switching point and yet to complete execution are long-latency instructions having a time to completion greater than a threshold amount If such long-latency instructions are present, then it may be desirable to perform the switching operation ahead of the switching point by cancelling execution of the long-latency instruction(s) and any following instructions which have already been issued in the first execution circuitry and then start execution program instructions by the second execution circuitry starting from and including the long-latency instruction. This technique recognises that it may be advantageous to switch early rather than wait for the long latency instruction to complete.

It will be appreciated that the long-latency instruction could take a variety of different forms, however, in some embodiments the long-latency instruction may be a load instruction which results in a cache miss within at least a lowest level of a cache memory which is used by the first execution circuitry. A cache miss will typically involve a long latency memory access and in practice the second processing circuitry may instead wait for this data rather than the first execution circuitry. Furthermore, by the time that the second execution circuitry has performed the switch, it may well be that the a data which corresponds to the cache miss will have been returned and accordingly the second execution circuitry will have a reduced wait.

In some embodiments the first latency indicating signals may include a branch mispredict signal indicative of a branch instruction misprediction that will be followed by an execution pipeline flush within the first execution circuitry. Such a branch instruction misprediction is a good candidate for a switching operation as the subsequent program instructions within the execution pipeline will be flushed and accordingly there will be no need to wait for them to be completed before the switch can be performed.

It will be appreciated that the first execution circuitry and the second execution circuitry can share different portions of the microarchitecture depending upon the particular implementation. In some embodiments the first execution circuitry and the second execution circuitry may share one or more of: instruction fetch circuitry, instruction decode circuitry; cache memory circuitry; branch predictor circuitry, memory management circuitry and/or translation lookaside buffer circuitry. A subset of the above or all of the above may be shared depending upon the particular implementation.

It will be appreciated that the second execution circuitry and the first execution circuitry have different performance characteristics as previously discussed. The way in which the performance varies may differ, for example, one instance of the execution circuitry may have better floating point performance and the other better integer performance. One candidate for use of the present technique is where the second execution circuitry has a lower power consumption and a lower rate of program instruction execution than the first execution circuitry. The switching from a high performance and more complex execution mechanism to a lower performance and less complex execution mechanism will often involve significant latency and accordingly the present technique which takes account of such latency in controlling whether or not to perform the switching operation may be useful.

Viewed from another aspect the present technique provides apparatus for processing data comprising:
  first execution means for executing program instructions;
  second execution means for executing program instructions;
  switching control means coupled to said first execution means and to said second execution means for controlling a switching operation between a first state in which program instructions are executed by said first execution means and a second state in which program instructions are executed by said second execution means, said switching operation including transferring at least some architectural state data from said first execution means to said second execution means, wherein
    said switching control means operates:
    to receive first latency indicating signals dependent upon a current state of said first execution means from said first execution means; and
    to control switching from said first state to said second state in dependence upon said first latency indicating signals, said first latency indicating signals indicating a first latency associated with switching from said first state to said second state.

Viewed from a further aspect the present technique provides a method of processing data comprising the steps of:
  executing program instructions with first execution circuitry;
  executing program instructions with second execution circuitry;
  controlling a switching operation between a first state in which program instructions are executed by said first execution circuitry and a second state in which program instructions are executed by said second execution circuitry, said switching operation including transferring at least some architectural state data from said first execution circuitry to said second execution circuitry, wherein
    said controlling comprises:
    receiving first latency indicating signals dependent upon a current state of said first execution circuitry from said first execution circuitry; and
    controlling switching from said first state to said second state in dependence upon said first latency indicating signals, said first latency indicating signals indicating a first latency associated with switching from said first state to said second state.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
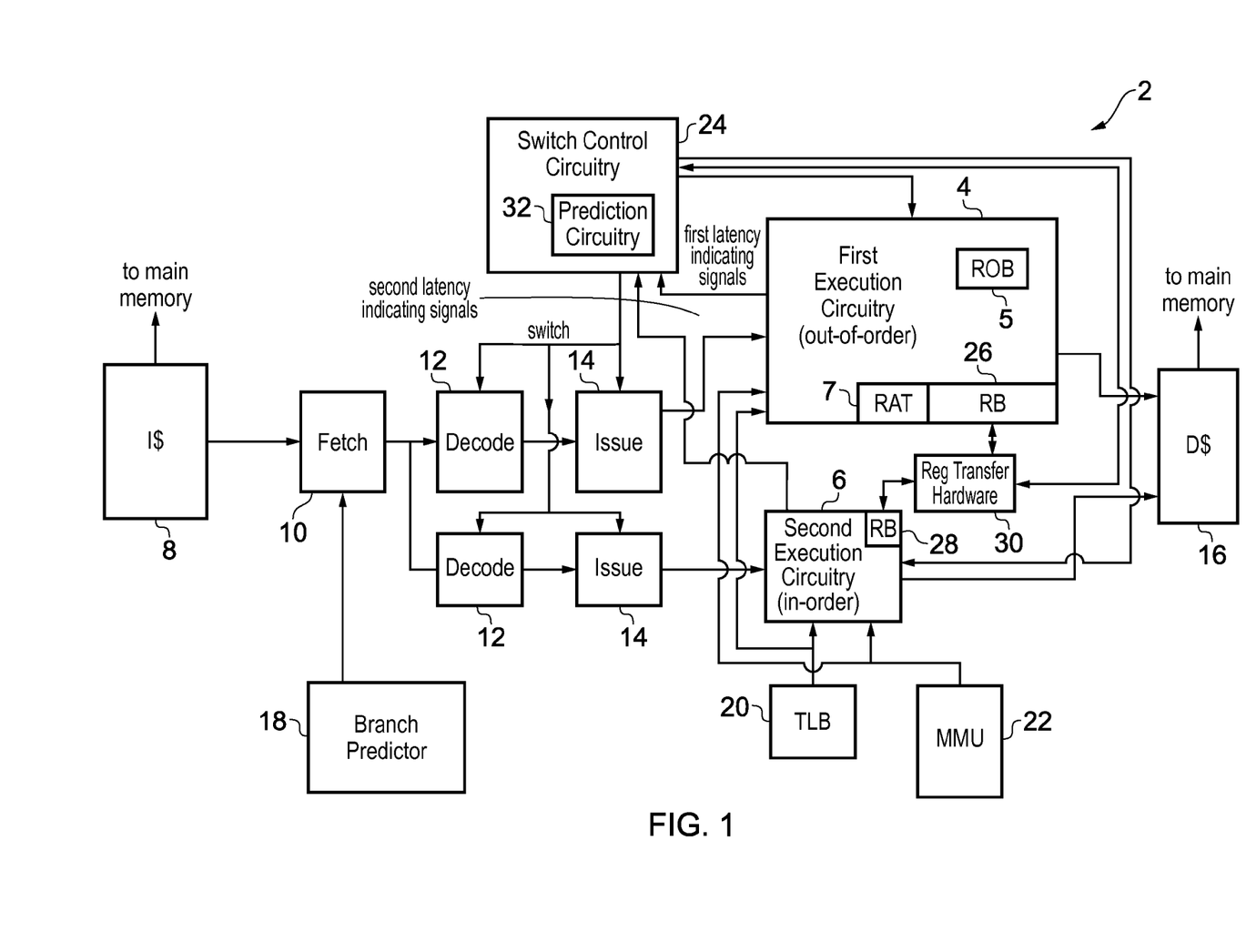
FIG. 1 schematically illustrates an apparatus for processing data including first execution circuitry and second execution circuitry.

FIG. 1 schematically illustrates apparatus 2 for processing data which may be formed on an integrated circuit, for example, as part of a system-on-chip integrated circuit. The apparatus 2 includes first execution circuitry 4 and second execution circuitry 6. The first execution circuitry comprises multiple execution pipelines, such as arithmetic pipelines, load/store pipelines, SIMD pipelines, floating point pipelines etc., which are configured to support out-of-order program execution. In order to support this out-of-order program execution, the first execution circuitry includes reorder buffer circuitry 5 storing state data associated with as yet uncommitted program instructions. The first execution circuitry 4 also includes register allocation table circuitry 7 which stores register allocation data representing a mapping between physical registers and architectural registers as will be familiar to those in the field of processor design for out-of-order processors.

It will be appreciated that the first execution circuitry 4 will typically yield a high performance in terms of the number of instructions per cycle which will be executed, but will typically have the disadvantage of consuming a higher level of power.

The second execution circuitry 6 comprises pipelines, such as an arithmetic pipeline, load/store pipeline, SIMD pipeline, vector pipeline, floating point pipeline etc. that are capable of supporting in-order execution. This second execution circuitry 6 will give a lower performance in terms of instructions per cycle executed, but will typically consume less energy than the first execution circuitry 4 when executing a given sequence of instructions. Accordingly, the second execution circuitry 6 has a lower energy consumption when executing a sequence of program instructions than the first execution circuitry 4, but the second execution circuitry 6 will take longer to execute that sequence of program instructions than the first execution circuitry 4. A first execution circuitry 4 accordingly provides a higher performance and higher power execution mechanism, whereas the second execution circuitry 6 represents a lower performance and lower power execution mechanism.

It will be appreciated that the first execution circuitry 4 and the second execution circuitry 6 differ in their microarchitecture and are heterogeneous. The differences between the first execution mechanism 4 and the second execution mechanism 6 are not limited to differences purely associated with the rate of instruction execution and the power level consumed. In some example embodiments of the present technique, the first execution mechanism may be well suited to executing a particular type of program instruction code, such as program instruction code containing many floating point program instructions, whereas the second execution circuitry may be better suited to executing program instructions containing many SIMD program instructions. Other specialisations/focuses of the execution mechanisms are also possible.

The apparatus of FIG. 1 will be seen to further include an instruction cache 8, instruction fetch circuitry 10, two instances of instruction decode circuitry 12, two instances of instruction issue circuitry 14, data cache 16, branch predictor circuitry 18, translation lookaside buffer circuitry 20 and memory management unit circuitry 22. The instruction cache 8, the fetch circuitry 10, the data cache 16, the branch predictor circuitry 18, the translation lookaside buffer circuitry 20 and the memory management unit circuitry 22 are shared by the first execution circuitry 4 and the second execution circuitry 6. Program instructions fetched from the instruction cache memory 6 by the instruction fetch circuitry 10 are decoded by the currently active one of the instruction decoders 12 and then placed within an issue queue within the currently active one of the instruction issue circuitry 14. The active instruction issue circuitry 14 issues these instructions to the associated active one of the first execution circuitry 4 or the second execution circuitry 6. When the first execution circuitry 4 is active, then this is a first state of the apparatus 2. When the second execution circuitry 6 is active, then this is a second state of the apparatus 2. Switching control circuitry 24 coupled to the two instances of the instruction issue circuitry 14 and the two instances of the instruction decode circuitry 12 controls selection of which of these are active and accordingly either the first execution circuitry 4 or the second execution circuitry 6 is active. In practice the inactive execution circuitry may be clock gated. When a change is made as to which of the first execution circuitry 4 or the second execution circuitry 6 is active, then a switching operation is performed which serves to transfer at least some of the architectural state data between the different execution circuitry instances. In the example illustrated, the first execution circuitry 4 includes first register file circuitry 26 and the second execution circuitry 6 includes second register file circuitry 28. The registers within the first register file circuitry 26 and the second register file circuitry 28 serve to store register values which are part of the architectural state of the system at any given time. Accordingly, when a switching operation is to be performed, the register data needs to be transferred from the originally active execution mechanism to the newly active execution mechanism. Register transfer hardware 30 is responsible for performing this transfer of register data as a hardware driven operation (without software intervention being required). The architectural state data held within all of the shared elements of the data processing apparatus need not be moved/switched when a change of active execution circuitry is made and the relatively small amount of state data held within the register file circuitry 26, 28 may be transferred with relatively little time or energy penalty (compared to big.LITTLE type systems) using the register transfer hardware circuitry 30. Nevertheless, there is a finite latency associated with making the transfer and measures which can take account this latency are advantageous.

Figure 2:
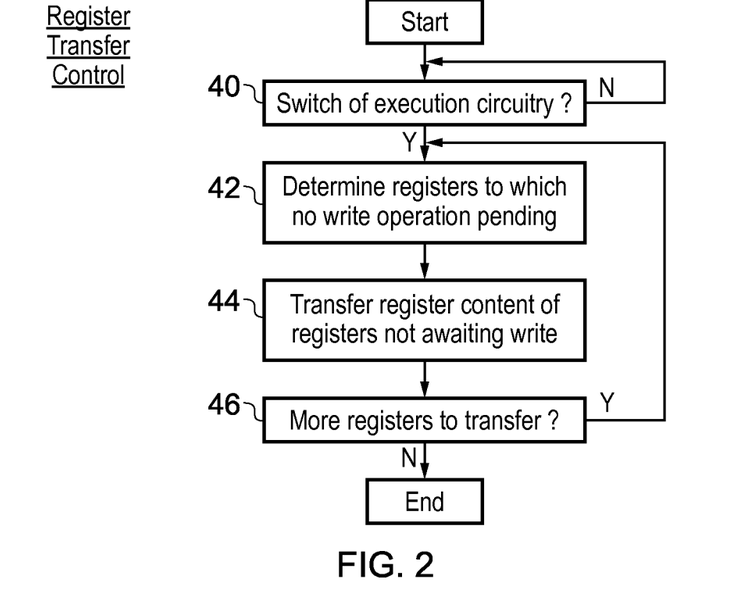
FIG. 2 is a flow diagram schematically illustrating register transfer control.

FIG. 2 is a flow diagram schematically illustrating register transfer control as may be performed by the register transfer hardware circuitry 30. At step 40 processing waits until a switch of execution circuitry is required. Step 42 then determines which registers within the register file from which a migration is to be made are ones to which there is no pending write operation. This determination may be made, for example, by reading a dirty bit which may be set when an instruction is issued that will write to a register, and cleared when that write is performed. Alternatively, the status of whether or not a register is awaiting a write may be tracked using register allocation table data and data from the reorder buffer.

At step 44 the transfer of register state data from those registers not awaiting a write is performed. Step 46 then determines whether or not there are more registers for which data has yet to be transferred. If there are more such registers, then processing returns to step 42, otherwise the register transfer will be completed.

As will be appreciated from FIG. 2, the register transfer hardware circuitry 30 may operate to transfer register state data while processing by the execution circuitry from which a migration is to be made continues. This permits earlier availability of that register state data within the target execution circuitry and accordingly gives the possibility for that target execution circuitry to commence processing earlier. The information as to which registers may be transferred earlier constitutes latency indicating information which may be exploited to control the switching operation such that overall latency associated with the switching operation is reduced.

Figure 3:
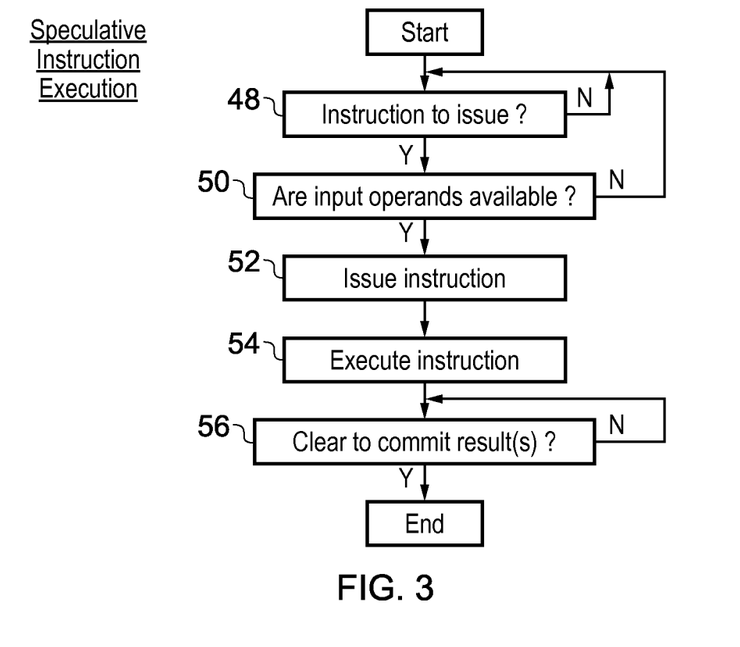
FIG. 3 is a flow diagram schematically illustrating speculative instruction execution.

FIG. 3 is a flow diagram schematically illustrating speculative instruction execution which may be started within the target execution mechanism before a switching operation is fully completed. At step 48 a determination is made as to whether or not there is an instruction ready to be issued to the target execution circuitry. Step 50 then determines whether or not the input operands for that instruction are available. If the input operands are register state data which has already been transferred, then they will be available and accordingly step 52 may issue that instruction to the target execution mechanism. Step 54 then executes that issued instruction and processing subsequently waits at step 56 until it is clear/safe to commit the results of the instruction execution. The ability to commit the results of the execution may, for example, be dependant upon the proceeding instructions all having completed properly, e.g. without an exception arising.

Figure 4:
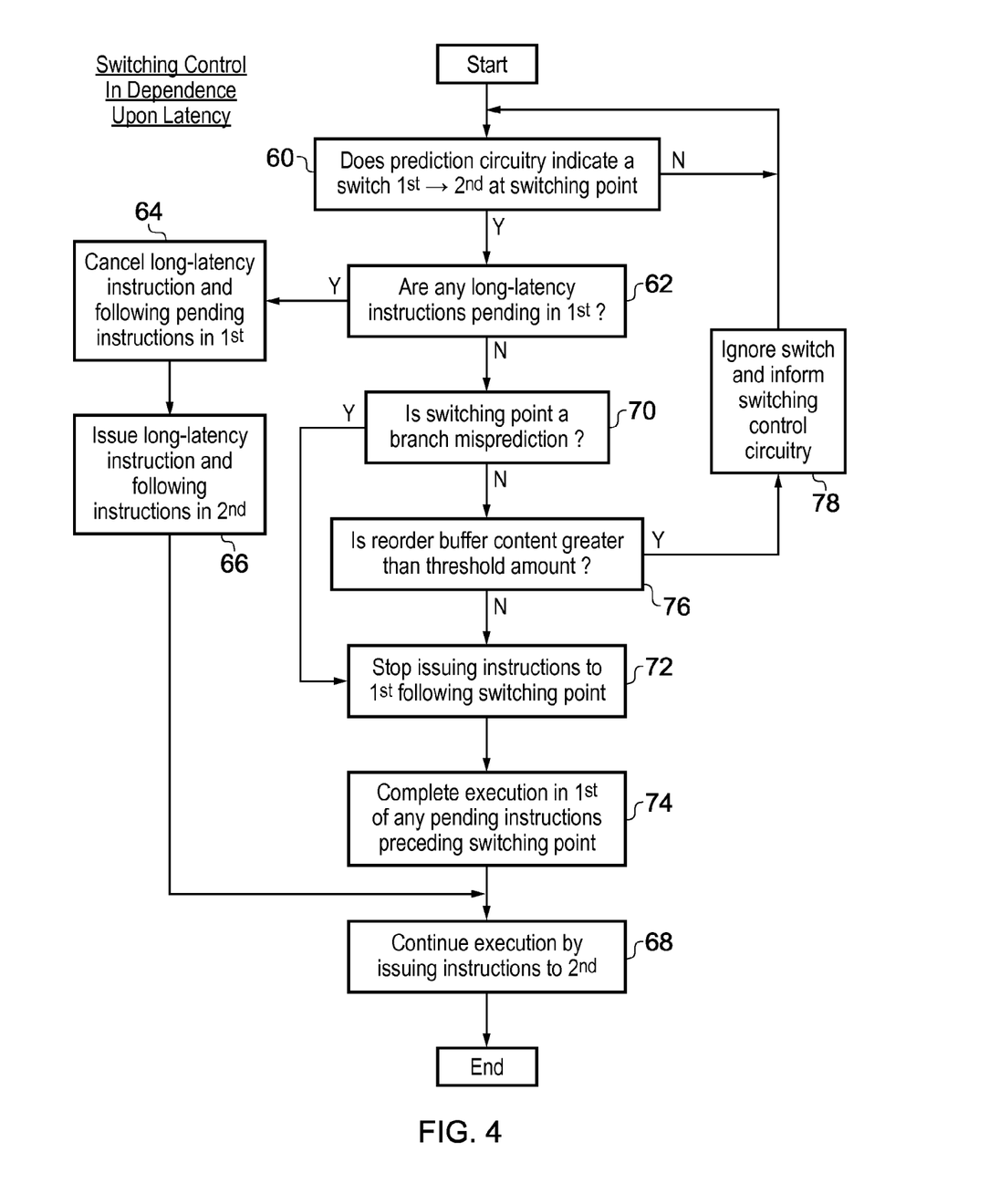
FIG. 4 is a flow diagram schematically illustrating switching control in dependence upon latency.

FIG. 4 schematically illustrates a flow diagram representing switching control in dependence upon the current latency that would be incurred by a switch from a first execution mechanism to a second execution mechanism. It will be appreciated that similar control may be provided for switching in the opposite direction, or for switching between further different execution mechanisms in a system which provides three or more execution mechanisms. Generally speaking, switching away from an execution mechanism which has a higher microarchitectural complexity will involve greater latency than one which involves switching away from an execution mechanism having a lower microarchitectural complexity.

At step 60 processing waits until the prediction circuitry 32 within the switching control circuitry 24 indicates that a switching operation from the first execution mechanism 40 the second execution mechanism 6 should be performed at a switching point within the program flow. When such a switching point is identified, processing proceeds to step 62 where a determination is made as to whether or not there are any long-latency instructions currently pending (e.g. partially completed) within the first execution circuitry 4. If there are such long-latency instructions pending, such as a load instruction which has resulted in a cache miss at at least the lowest level within the cache hierarchy and accordingly is waiting at the commit stage for the data to be returned, then processing proceeds to step 64. Other examples of pending long-latency instructions are also possible, e.g. a not supported vector instruction that will trigger an exception.

At step 64 the long-latency instruction and any following instructions pending within the first execution circuitry 4 are cancelled. At step 66 the long-latency instruction is issued to the second execution circuitry 6 as are the following instructions which were cancelled at step 64. Processing then proceeds to step 68 where continued execution of the program instruction stream by the second execution circuitry 6 is performed.

If the determination at step 62 is that no long-latency instructions were identified, then processing proceeds to step 70 where a determination is made as to whether or not the switching point identified is one corresponding to a branch misprediction. A branch misprediction point has the advantage to that the program instructions following the mispredicted branch will necessarily be flushed from the first execution circuitry and need not be drained with the associated latency. Accordingly, if the switching point does correspond to a branch misprediction, then processing proceeds to step 72 where instruction issue to the first execution circuitry following the switching point is stopped. Step 74 then completes execution by the first execution circuitry of any pending instructions preceding the switching point. If the switching point was a branch misprediction as identified at step 70, then the preceding instructions will likely already have been completed and accordingly there will be no pending instructions preceding the switching point which need to be flushed. Processing then proceeds to step 68 with the continuing execution of the program instruction stream by issuing of instructions to the second execution circuitry 6.

If the determination at step 70 is that the switching point is not a branch misprediction, then processing proceeds to step 72 where there is a determination as to the occupancy level of the reorder buffer circuitry 5. If this occupancy level is greater than a threshold amount, then processing proceeds to step 78 where the switch is ignored and a message returned to the switching control circuitry 24 that the switch has been ignored. This informs the switching control circuitry 24 that the system continues to operate with the first execution circuitry 4 and that the switching operations, including transfer of the architectural state data, need not be performed. If the determination at step 76 was that the reorder buffer had less than the threshold amount of content, then the latency associated with the switch is acceptable and processing proceeds to step 72.

It will be appreciated from the above that the latency indicating signals can take a wide variety of different forms. The switching control circuitry 24 responds to these latency indicating signals to modify the switching operation in a manner indicated by those latency indicating signals. The modification may take the form of preventing the switching operation being performed, accelerating the switching operation, initiating speculative processing or early register transfer, as well as other possibilities.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data comprising:
   first execution circuitry configured to execute program instructions;
   second execution circuitry configured to execute program instructions;
   switching control circuitry coupled to said first execution circuitry and to said second execution circuitry and configured to control a switching operation between a first state in which program instructions are executed by said first execution circuitry and a second state in which program instructions are executed by said second execution circuitry, said switching operation including transferring at least some architectural state data from said first execution circuitry to said second execution circuitry, wherein
   said switching control circuitry is configured:
      to receive first latency indicating signals dependent upon a current state of said first execution circuitry from said first execution circuitry;
      to control switching from said first state to said second state in dependence upon said first latency indicating signals, said first latency indicating signals indicating a first latency incurred by switching from said first state to said second state; and
      to control said second execution circuitry to commence speculatively executing program instructions based upon a partial transfer of said at least some architectural state data before said first execution circuitry has finished executing program instructions; and
   wherein said at least some architectural state data comprises state data from registers within said first execution circuitry for which there are no pending write operations.

2. Apparatus as claimed in claim 1, wherein said second execution circuitry has performance characteristics different from said first execution circuitry.

3. Apparatus as claimed in claim 1, wherein said switching control circuitry is configured:
   to receive second latency indicating signals dependent upon a current state of said second execution circuitry from said second execution circuitry; and
   to control switching from said second state to said first state in dependence upon said second latency indicating signals, said second latency indicating signals indicating a second latency associated with switching from said second state to said first state.

4. Apparatus as claimed in claim 1, wherein said first execution circuitry comprises first register file circuitry and said second execution circuitry comprises second register file circuitry and wherein said switching control circuitry is configured to transfer as a hardware driven operation register state data between said first register file circuitry and said second register file circuitry when there is a change between said first state and said second state.

5. Apparatus as claimed in claim 4, wherein first latency indicating signals are indicative of pending write operations to respective registers within said first register file circuitry and wherein said switching operation transfers register state data from registers within said first register file circuitry for which there are no pending write operations to said second register file circuitry before said first execution circuitry has finished execution of program instructions.

6. Apparatus as claimed in claim 5, wherein said first register file circuitry is configured to track registers within said first register file circuitry to which a write operation by said first execution circuitry is pending.

7. Apparatus as claimed in claim 6, wherein dirty bits within said first register file circuitry serve to track registers to which a write operation by said first execution circuitry is pending.

8. Apparatus as claimed in claim 5, wherein said switching operation transfers register state from registers for which a write operation is initially pending after said write operation is performed.

9. Apparatus as claimed in claim 4, wherein said first execution circuitry comprises register allocation table circuitry configured to store register allocation data indicative of which of a plurality of physical registers within said first register file circuitry is mapped to which of a plurality of architectural register identifiers, said hardware driven operation reads said register allocation data from said register allocation table circuitry and said register allocation table circuitry ceases to be accessed as a consequence of no new program instruction dispatched to said first execution circuitry during said switching operation.

10. Apparatus as claimed in claim 1, wherein said switching control circuitry is configured to identify a potential switch point within a sequence of program instructions for switching from said first state to said second state.

11. Apparatus as claimed in claim 1, wherein said switching control circuitry is configured to suppress said switching from said first state to said second state if said first latency indicating signal indicates a latency of greater than a threshold latency.

12. Apparatus as claimed in claim 11, wherein said first execution circuitry comprises reorder buffer circuitry configured to store state data for uncommitted program instructions, said first latency signals comprise a signal indicative of occupancy of said reorder buffer circuitry and said threshold latency corresponds to an occupancy of said reorder buffer of greater than a threshold amount.

13. Apparatus as claimed in claim 10, wherein said first execution circuitry comprises first execution pipeline circuitry configured to perform pipelined execution of a plurality of program instructions and said switching operation normally operates to drain said first execution pipeline circuitry by stopping issuing instructions following said switching point to said first execution pipeline circuitry and completing execution of program instructions proceeding said switching point within said first execution pipeline circuitry.

14. Apparatus as claimed in claim 13, wherein said first latency indicating signals comprise a time-to-complete signal indicating whether at least one program instructions proceeding said switching point and yet to complete execution by said first execution pipeline circuitry is a long-latency instruction having time to completion of greater than a threshold amount and, if such a said long-latency instruction is yet to complete execution, then said switching operation cancels execution of said long-latency instruction and following instruction pending within said first execution pipeline circuitry and starts execution of program instructions by said second execution circuitry starting from and including said long-latency instruction.

15. Apparatus as claimed in claim 14, comprising a cache memory and a main memory shared by said first execution circuitry and said second execution circuitry and said long-latency instruction is a load instruction resulting a cache miss within at least a lowest level of said cache memory.

16. Apparatus as claimed in claim 1, wherein said first latency indicating signals include a branch mispredict signal indicative of a branch instruction misprediction followed by an execution pipeline flush by said first execution circuitry and said switching operation is performed at a switching point within program instruction execution corresponding to said branch instruction misprediction.

17. Apparatus as claimed in claim 1, wherein said first execution circuitry and said second execution circuitry share one or more of: instruction fetch circuitry, cache memory circuitry, branch predictor circuitry, memory management circuitry and translation lookaside buffer circuitry.

18. Apparatus for processing data comprising:
first execution means for executing program instructions;
second execution means for executing program instructions;
switching control means coupled to said first execution means and to said second execution means for controlling a switching operation between a first state in which program instructions are executed by said first execution means and a second state in which program instructions are executed by said second execution means, said switching operation including transferring at least some architectural state data from said first execution means to said second execution means, wherein
said switching control means operates:
to receive first latency indicating signals dependent upon a current state of said first execution means from said first execution means;
to control switching from said first state to said second state in dependence upon said first latency indicating signals, said first latency indicating signals indicating a first latency incurred by switching from said first state to said second state; and
to control said second execution means to commence speculatively executing program instructions based upon a partial transfer of said at least some architectural state data before said first execution means has finished executing program instructions; and
wherein said at least some architectural state data comprises state data from registers within said first execution means for which there are no pending write operations.

19. A method of processing data comprising the steps of:
executing program instructions with first execution circuitry;
executing program instructions with second execution circuitry;
controlling a switching operation between a first state in which program instructions are executed by said first execution circuitry and a second state in which program instructions are executed by said second execution circuitry, said switching operation including transferring at least some architectural state data from said first execution circuitry to said second execution circuitry, wherein
said controlling comprises:
receiving first latency indicating signals dependent upon a current state of said first execution circuitry from said first execution circuitry;
controlling switching from said first state to said second state in dependence upon said first latency indicating signals, said first latency indicating signals indicating a first latency incurred by switching from said first state to said second state; and
controlling said second execution circuitry to commence speculatively executing program instructions based upon a partial transfer of said at least some architectural state data before said first execution circuitry has finished executing program instructions, and
wherein said at least some architectural state data comprises state data from registers within said first execution circuitry for which there are no pending write operations.

* * * * *